United States Patent [19]
Hamada et al.

[11] Patent Number: 5,933,791
[45] Date of Patent: Aug. 3, 1999

[54] CYLINDRICAL MACROMOLECULE AND PHOTOMETER AND MAGNETOMETER USING THE SAME

[75] Inventors: Noriaki Hamada; Kuniichi Ohta, both of Tokyo, Japan

[73] Assignee: NEC Corporation, Japan

[21] Appl. No.: 08/673,614

[22] Filed: Jun. 25, 1996

Related U.S. Application Data

[62] Division of application No. 08/467,862, Jun. 6, 1995, abandoned, which is a continuation of application No. 08/014,817, Feb. 8, 1993, abandoned.

[30] Foreign Application Priority Data

Feb. 6, 1992 [JP] Japan ..................................... 4-056306

[51] Int. Cl.$^6$ .................................................. G06F 19/00
[52] U.S. Cl. ............................................... 702/30; 702/32
[58] Field of Search .................................... 364/496, 578; 428/408; 423/445 B; 702/30, 32

[56] References Cited

PUBLICATIONS

Hamada et al., "Electronic Band Structure of Carbon Nanotubes" Int. Conf. Phys. Semicond. 21st. pp. 1840–1843, Aug. 1992.

Iijima, "Helical Microtubules of Graphitic Carbon" Nature, v. 354, pp. 56–58, 1991.

*Primary Examiner*—Melanie Kemper
*Attorney, Agent, or Firm*—Ostrolenk, Faber, Gerb & Soffen, LLP

[57] ABSTRACT

In a concentric cylinder macromolecule represented by a combination of B(2,1)n (n=1, 2, . . . ), each layer thereof has a conductivity of metal and hence there is obtained a concentric cylinder having a high conductivity. In graphite, the layers are bonded with each other by a weak van der Waals force and a two-dimensional band structure can be assumed. In a multi-layer cylinder, since the number of hexagons in the radial direction varies between the layers, the layers are much more independent of each other. There are accordingly implemented a semiconductor having a narrow band gap and a semiconductor having a relatively wide band gap; consequently, the macromolecule can be broadly adopted for various functional devices.

13 Claims, 9 Drawing Sheets

1: CYLINDRICAL MACROMOLECULE

CYLINDRICAL MACROMOLECULE AND PHOTOMETER AND MAGNETOMETER USING THE SAME

This is a division of application Ser. No. 08/467,862, filed Jun. 6, 1995, now abandoned, which is a continuation of application Ser. No. 08/014,817 filed Feb. 8, 1993 abandoned, which corresponds to Japanese Patent Application No. 92-56306, filed Feb. 6, 1992.

BACKGROUND OF THE INVENTION

The present invention relates to a cylindrical macromolecule of carbon having a fine cylindrical structure and various kinds of functional devices or elements utilizing the macromolecule.

DESCRIPTION OF THE RELATED ART

There has been recently discovered a carbon macromolecule in the form of cylinder having a diameter of an order of nanometers (as described by Iijima in pages 56 to 58 of Nature, Vol. 354; 7 November 1991).

The macromolecule has as a repeated constituent unit in configuration thereof a hexagonal structure consisting of carbon atoms and covalent bonds therebetween, like a benzene nucleus. In the macromolecule, the hexagonal structure is repeated both horizontally and vertically, i.e., in both axial and circumferential directions of the macromolecule, to form a cylindrical structure. In some macromolecules, the cylindrical structure itself serves as a constituent unit, i.e., there are formed several cylindrical structures different in diameter and coaxially arranged to provide a nested configuration. The diameter of such a cylindrical structure is quite small, namely, about one nanometer (nm) or more. The interfacial distance between a pair of directly facing cylindrical structures in a nested macromolecule is about 0.34 nanometers, and is substantially identical to that between graphite molecule layers. The number of diameter-different cylindrical structures in a nested macromolecule is, for example, two, three, four or five. Hereinbelow, the macromolecule is at times referred to as "a carbon nanotube", "a nanotube" or "a carbon tube".

Since there has not been elapsed a long period of time for the investigation of the carbon tube, details of the relationships between the band structure has not been elucidated and the molecular structure and hence applications thereof to specific devices have not been proposed.

SUMMARY OF THE INVENTION

It is therefore an object of the present invention to elucidate the relationships between the band structure and the molecular structure of carbon nanotubes and to provide according thereto a carbon-nanotube device having a desired feature.

It also is an object of the present invention to make use of the elucidated relationships such as for identification, classification, isolation, property estimation and design of a carbon nanotube.

To achieve the object, the present invention discloses a number of elucidated relationships between the band structure and the molecular structure of carbon nanotubes, while introducing a set of implemented notations to facilitate the understanding of those relationships as well as the handling of associated data. The notations will be employed through the specification.

Carbon nanotubes formed by a known or unknown method may have unknown configurations. However, the carbon nanotubes to the invention are restricted to those having a cylindrical configuration that may be single-layered or multi-layered. For the introduction of a notation, any single-layered cylindrical nanotube is compared with a graphite layer that, as well-known, comprises a planar network consisting of numbers of arrays of a repeated hexagon as a molecular unit constituted with carbon atoms arranged like a benzene nucleus, with covalent bonds formed along respective sides of the hexagon, and any multi-layered cylindrical nanotube is deemed as a nested combination of a number of single-layered cylindrical nanotubes. The single-layered nanotube, which has a cylindrical structure consisting of a repeated hexagonal structure, as described, is then considered to be formed by rolling up or folding the planar network into the same configuration as the cylindrical structure, so that each hexagon in the planar network overlaps any hexagonal structure in the cylindrical structure.

As will be seen, the rolling for the notation in concern corresponds to the mathematical mapping of a repeated hexagon defined on a straight plane, i.e., the planar network, onto a repeated hexagon defined on a cylindrical plane, i.e., the cylindrical structure. For the calculation of the mapping, an arbitrary hexagon on the straight plane is identified by a position vector $g=n_1a+n_2b$ of the geometrical barycenter thereof with respect to that of an arbitrarily selectable reference hexagon, as an origin on the plane, where "a" is a basic vector starting from the origin and ending at the barycenter of an adjacent hexagon to an arbitrarily selectable reference side of the reference hexagon, "b" is another basic vector starting from the origin and ending at the barycenter of an adjacent hexagon to that side of the reference hexagon which is located at an upper-left hand of the origin when the reference side is located at the right hand of the origin (i.e., the vector b forms an angle of 120° with the vector a), and "$n_1$" and "$n_2$" are integers corresponding to the position of the hexagon to be identified. The identified hexagon by the position vector $g=n_1a+n_2b$ on the straight plane is then expressed simply by $n_1$, $n_2$).

Therefore, in the present invention, for a notation to be employed therein, the cylindrical structure of the carbon nanotube is considered to be formed by rolling the planar network of a graphite layer so that an identified hexagon ($n_1$, $n_2$) just overlaps a reference hexagon (0, 0), while any hexagon in the planar network is defined by a position vector of the geometric barycenter of the hexagon with respect to an origin that is the geometric barycenter of the reference hexagon, which is assumed to have a right hand thereof in the perpendicular direction to a pair of parallel sides thereof, such that those hexagons arrayed in the direction of a right side of the reference hexagon are expressed by ($n_1$, 0), ($n_1$=1, 2, 3, . . . ), those hexagons arranged in the direction of the upper-left side of the reference hexagon are expressed by (0, $n_2$) ($n_2$=1, 2, 3, . . . ), and an arbitrary hexagon identified by a position vector $g=n_1a+n_2b$ is expressed by ($n_1$, $n_2$).

Then, in the present invention, a single layered carbon nanotube having an according cylindrical structure to a rolling pattern in which ($n_1$, $n_2$) overlaps (0, 0) is expressed by a notation, such that A($n_1$, $n_2$).

Then, to achieve the object, the genus of the present invention provides an elucidated relationship such that a nanotube has a metallic band structure showing a metallic property with a high electric conductivity, when it has a structure of A($n_1$, $n_2$) meeting a condition of $n_1-2n_2=0$, and on this basis further provides a property estimation method of a cylindrical nanotube comprising the steps to confirm that the nanotube has a structure of $A(n_1, n_2)$, confirming that the structure meets a condition of $n_1-2n_2=0$, and concluding that the nanotube has a metallic band structure.

Moreover, to achieve the object, another genus of the present invention provides an elucidated relationship such that a nanotube has a band structure with a narrow band gap, when it has a structure of $A(n_1, n_2)$ meeting a condition of $n_1-2n_2=3l$ ($l=1, 2, 3, \ldots$), and on this basis further provides a property estimation method of a cylindrical nanotube comprising the steps of confirming that the structure meets a condition of $n_1-2n_2=3l$ ($l=1, 2, 3, \ldots$), and concluding that the nanotube has a band structure with a narrow band gap.

Further, to achieve the object, another genus of the present invention provides an elucidated relationship such that a nanotube has a band structure with a moderate band gap, when it has a structure of $A(n_1, n_2)$ meeting a combined condition of $n_1 \neq 2n_2$ and $n_1-2n_2 \neq 3l$ ($l=1, 2, 3, \ldots$) or in other words a condition of $n_1-2n_2 \neq 3l$ ($l=0, 1, 2, \ldots$), and on this basis further provides a property estimation method of a cylindrical nanotube comprising the steps of confirming that the nanotube has a structure of $A(n_1, n_2)$, confirming that the structure meets a condition of $n_1-2n_2 \neq 3l$ ($l=0, 1, 2, \ldots$), and concluding that the nanotube has a band structure with a moderate band gap.

In the present invention, for simplification of the notation $A(*, *)$ there is employed another notation $B(*, *)*$ such that, letting an integer n be a greatest common measure of $n_1$ and $n_2$, and $n_1=l_1n$ and $n_2=l_2n$, where $l_1$ and $l_2$ are relatively prime integers, $B(l_1, l_2)n$ substitutes for $A(n_1, n_2)$ and that, letting n be a set of integers, $B(l_1, l_2)n$ represents a nested carbon nanotube, i.e., a multi-layered nanotube consisting of a corresponding plurality of diameter-different coaxial nanotubes to the number of elements of the set n.

Another genus of the present invention provides a property estimation method of a cylindrical nanotube consisting of a plurality of coaxial nanotubes, comprising a first step of confirming that each coaxial nanotube has a metallic band structure when it is single-layered, and a second step of concluding that each coaxial nanotube has a metallic band structure in the cylindrical nanotube.

According to a species of this genus of the invention, the first step comprises the steps of confirming that the cylindrical nanotube has a structure of $B(l_1, l_2)n$, where n is a set of integers, and confirming that, letting p be an arbitrary element of n, the structure meets a condition of $l_1p-2l_2p=0$ for each p.

According to one of this species of the invention, $l_1=2$, $l_2=1$, and the set n may comprise a subset of a sequence of increasing integers with a variable difference between 2 and 6, both inclusive.

According to this species of the invention, the subset may comprise $q=rs$, where r is 5, q is an integer between 1 and r, both inclusive, and s is a set of continuous integers. It will be seen that for a given set $S$ (=$\{S_i\}$) an expression $q+rS$ represents a componentwise operation such that $\{q+r \times S_i\}$ and hence, in the case $q=1$ and $S=\{0, 1, 2\}$ it so follows that the set n comprises $\{1+5 \times 1, 1+5 \times 2, 1+5 \times 3\}=\{6, 11, 16\}$ and the structure $B(2, 1)n$ is representable such that $B(2,1)\{6, 11, 16\}=\{A(12, 6), A(22, 11), A(32, 16)\}$.

Another genus of the present invention provides a property estimation method of a cylindrical nanotube consisting of a plurality of coaxial nanotubes, comprising a first step of confirming that each coaxial nanotube has a band structure with a narrow band gap when it is single-layered, and a second step of estimating that each coaxial nanotube has a band structure with a narrow band gap in the cylindrical nanotube.

According to a species of this genus of the invention, the first step comprises the steps of confirming that the cylindrical nanotube has a structure of $B(l_1,l_2)n$, where n is a set of integers, and confirming that, letting p be an arbitrary element of n, the structure meets a condition of $l_1p-2l_2p=3l$ ($l=1, 2, 3, \ldots$) for each p.

According to one of this species of the invention $l_1=1$, $l_2=0$, and $n=3m$, where m is a set of continuous positive integers.

According to this species of the invention, the set n may be $3+9S$, $6+9S$, or $9+9S$ where S is a set of continuous integers, or in other words the set m may be $1+3S$, $2+3S$, or $3+3S$ and hence the set m may be a sequence of increasing integers with a difference of 3.

According to this genus of the invention, the cylindrical nanotube may have a structure of: $B(3,1)3m$ or $B(4,1)3m$ where m is a set of positive continuous integers; $B(5,1)(2S+1)$ or $B(5,1)(2S+2)$, where S is a set of continuous integers; or $B(8,1)n$, $B(11,4)n$, where n is a set of integers.

Another genus of the present invention provides a property estimation method of a cylindrical nanotube consisting of a plurality of nanotubes, comprising a first step of confirming that each coaxial nanotube has a band structure with a moderate band gap when it is single-layered, and a second step of estimating that each coaxial nanotube has a band structure with a moderate band gap in the cylindrical nanotube.

According to a species of this genus of the invention, the first step comprises the steps of confirming that the cylindrical nanotube has a structure of $B(l_1, l_2)n$, where n is a set of integers, and confirming that, letting p be an arbitrary element of n, $l_1p-2l_2p \neq 3l$ ($l=0, 1, 2, \ldots$) for each p.

According to one of this species of the invention, $l_1=1$, $l_2=0$, and the set n comprises a subset of a sequence of integers consisting $1+3S$ and $2+3S$, where S is a set of continuous integers, or in other words the set n comprises a sequence of prime integers to 3.

According to this individual of the invention, the sequence of prime integers may comprise a subset of a sequence of increasing integers with a difference of 9.

According to the species of the invention, the cylindrical nanotube may have a structure of $B(3,1)n$ or $B(4,1)n$, where n is a sequence of prime integers to 3.

Furthermore, another genus of the present invention provides a property estimation method of a cylindrical nanotube consisting of a plurality of coaxial nanotubes, comprising a first step of confirming that the coaxial nanotubes fall into a first type that has a band structure with a narrow band gap, when it is single-layered, and a second type that has a band structure with a moderate band gap when it is single-layered, and a second step of estimating that each coaxial nanotube of the first type has a band structure with a narrow band gap in the cylindrical nanotube and that each coaxial nanotube of the second type has a band structure with a moderate band gap in the cylindrical nanotube.

According to the species of this genus of the invention, the first step comprises the steps of confirming that the cylindrical nanotube has a structure of $B(l_1, l_2)n$, where n is a set of integers consisting of a pair of subsets complementary to each other, confirming that, letting p and q be arbitrary elements of the subsets, respectively, the structure meets a combined condition of $l_1p-2l_2p=3\ l$ ($l=1, 2, 3, \ldots$) for each p and $l_1q-2l_2q \neq 3l$ ($l=1, 2, 3, \ldots$) for each q, subject to $l_1q-2l_2q \neq 0$, and estimating that each coaxial nanotube of the first type ha a structure of $A(l_1p, l_2p)$ and each coaxial nanotube of the second type has a structure of $A(l_1q, l_2q)$.

According to one of the species of the invention, the second step includes estimating that a pair of coaxial nanotubes of the first type have interposed therebetween a pair of coaxial nanotubes of the second type adjacent to each other.

According to this species of the invention, the structure of the cylindrical nanotube may be: B(7,0)n, B(7,1)n, B(7,3)n, B(8,3)n, B(9,1)n, B(9,2)n, B(9,4)n, B(10,1)n, B(10,3)n, B(11,0)n, B(11,2)n, B(11,3)n, B(11,5)n, or B(12,5)n; B(1,0)n, where n is a sequence of increasing integers with a difference of 8 or 10; B(4,1)n, where n is a sequence of increasing integers with a difference of 2; B(6,1)n, where n is a sequence of increasing integers with a difference of 2; or B(3,1)n, where n is a sequence of increasing integers with a difference of 4.

It will be understood that the notations described are employed for a better understanding of the present invention, so that they should be interpreted as what they mean.

Figure 2:
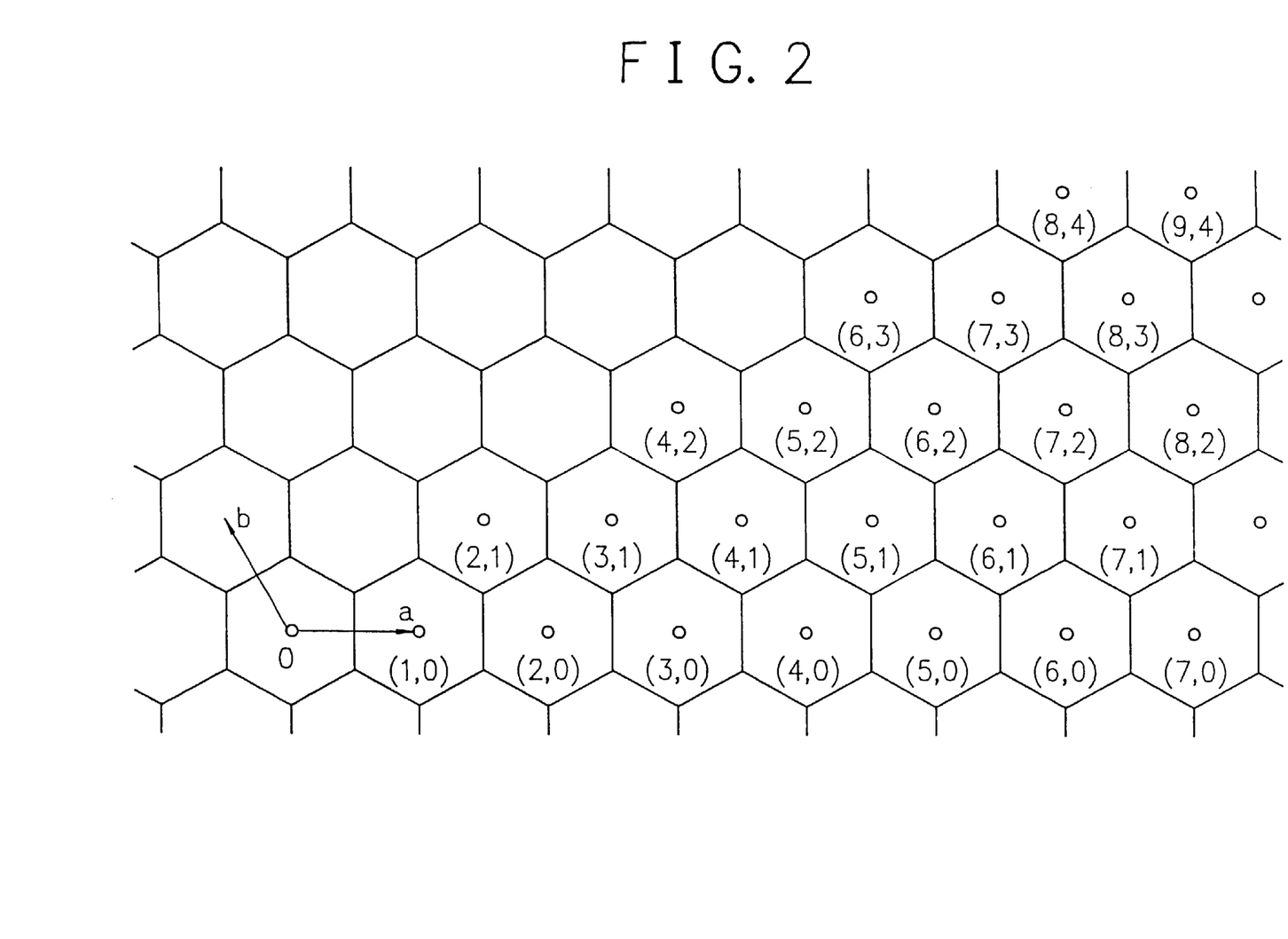
FIG. 2 is a diagram useful to explain definition of molecular structure.

"a": a basic displacement vector of unit structure, having a righthand sense in FIG. 2.

"b": another basic displacement vector of the unit structure, having an upper lefthand sense in FIG. 2.

"g": (=$an_1+bn_2$): a position vector on a planar network.

"$n_1$", "$n_2$": integers bound to the position vector

"($n_1,n_2$)": a corresponding hexagon to the position vector

"(0,0)": an origin on the planar network

"A($n_1,n_2$): a single-layer nanotube as a planar network rolled to have a hexagon ($n_1,n_2$) superimposed on the origin (0,0)

"n": the greatest common measure between $n_1$ and $n_2$, such that $n_1=l_1n$ and $n_2=l_2n$. (n may be a single integer or a set of integers)

"$l_1$", "$l_2$": relatively prime integers

"l": an element of a sequence of increasing integers with a difference of 1, i.e., an arbitrary element of (0, 1, 2, . . . ) or (1, 2, 3, . . . )

"B($l_1,l_2$)n" (n=single integer): A($l_1n,l_2n$)

"B($l_1,l_2$)n" (n=set of integers): a multi-layer nanotube as {A($l_1p,l_2p$); p∈n}

"p": an integer as an arbitrary element of the set n

"q": a supplementary legend for an integer, q may be a variable integer in an expression q+rm or an arbitrary element (≠p) of a subset of n "r": a supplementary legend for an integer, r may be a fixed integer in the expression q+rm "m": a supplementary legend for a set of integers, m may be a set of continuous positive integers, excluding 0

"s": a supplementary legend for a set of integers, s may be a set of continuous integers, including 0.

In a photometer in accordance with the present invention, there is utilized a change of electric resistance of the cylindrical macromolecule with respect to light.

In a magnetometer in accordance with the present invention, there is utilized a change of electric resistance of the cylindrical macromolecule with respect to magnetoresistance.

In this regard, hexagonal benzene-like molecules of carbon formed through a covalent bonding of carbon atoms are arranged in a honeycomb network having a planar net surface, the network being rolled into a cylindrical shape. When the network is rolled in a direction along parallel sides of the hexagon of the molecule, there is developed a high electric conductivity; whereas, when the network is rolled in a direction vertical to parallel sides of the hexagon of molecule, there is formed a semiconductor having a narrow band gap. In addition, there are attained a semiconductor of another arrangement having a relatively large band gap, a multi-layer macromolecule structure including concentric cylindrical macromolecules above, and a complex including such multi-layer molecule structures disposed in a bundle. Features possessed by the cylindrical macromolecule are applicable to a thermometer, a pressure gauge, a distortion meter, a photometer, a magnetic flux measuring apparatus, and the like.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the drawings, a description will be given of embodiments in accordance with the present invention.

Figure 1:
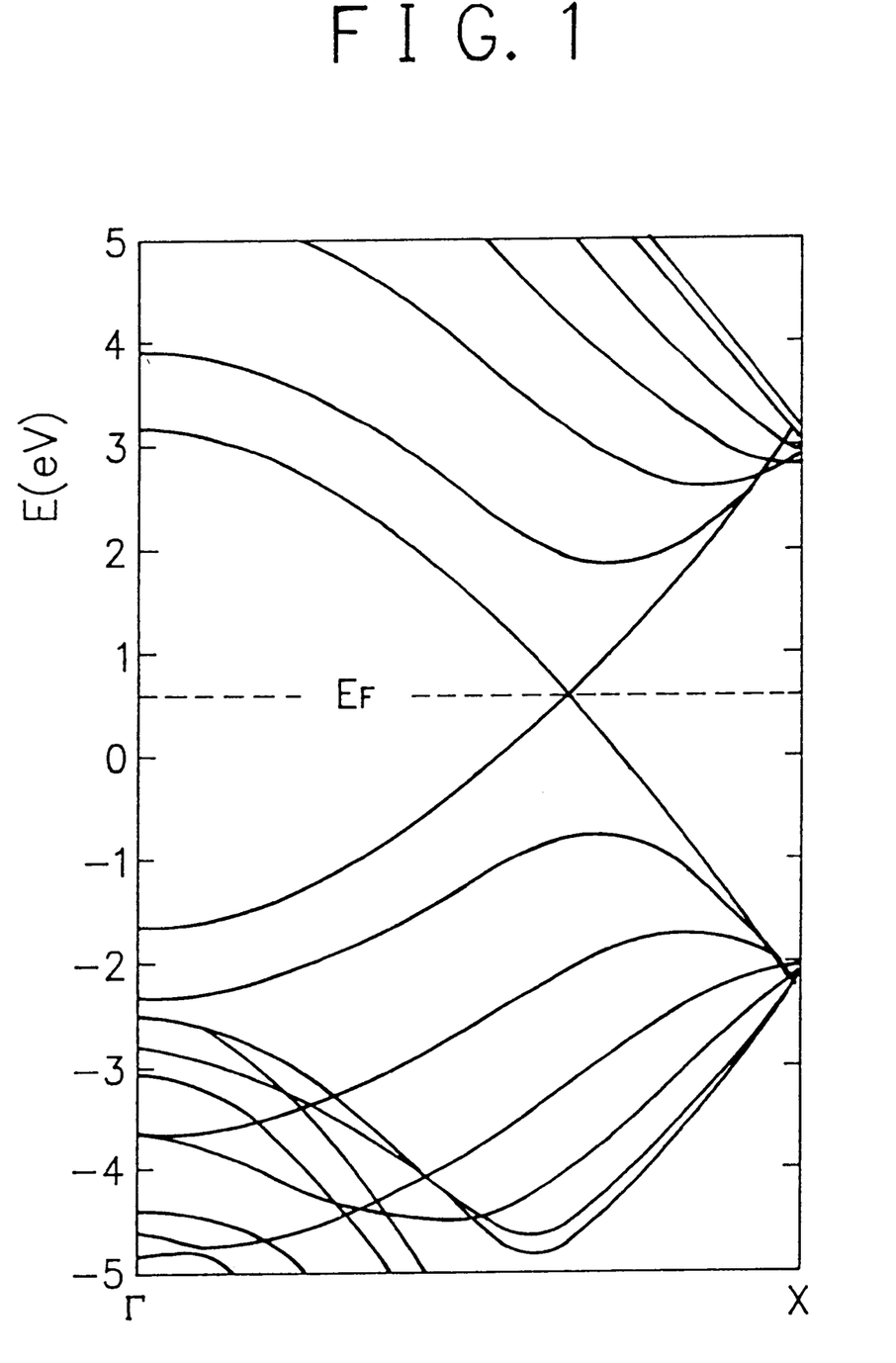
FIG. 1 is a schematic diagram showing the band structure of a cylindrical macromolecule in a first embodiment in accordance with the present invention.

FIG. 1 shows the band structure of a substance in a first embodiment of a cylindrical macromolecule in accordance with the present invention. The cylindrical matter according to the present invention has a one-dimensional band structure in the longitudinal direction as shown in this diagram. Namely, the structure includes two bands intersecting the Fermi level at a point and develops the conductivity of metal.

FIG. 2 is a diagram to define the structure of this matter. In graphite, hexagonal molecule units each including carbon atoms arranged in the form of a benzene shell are disposed in a planar network to form a sheet in a multi-layer configuration.

The structure of the macromolecule in accordance with the present invention is obtained by rolling the sheet into a cylinder.

In FIG. 2, the construction of the cylindrical macromolecule is classified as follows. First, assuming a hexagon 0 as the origin, basic parallel displacement parallel vectors a and b are defined as shown in this diagram on the basis of the origin. For an arbitrary hexagon, the positional vector of the barycenter thereof is expressed as $g=n_1a+n_2b\equiv(n_1,n_2)$.

In this connection, the cylinder is formed by rolling the sheet so that the hexagon of the origin 0 i.e. (0,0), overlaps that of the point $(n_1,n_2)$. However, in this situation, it is only necessary to consider a condition $n_1 \geq 2n_2 \geq 0$. For the other cases, the results are equivalent to that described above. Consequently, an arbitrary cylinder can be identified by a pair $(n_1,n_2)$ of two integers. Herebelow, to identify the structure of the cylinder, an index $A(n_1,n_2)$ will be defined. Moreover, even when the index $A(n_1,n_2)$ is determined, there exists two spiral structures depending on the rolling direction (clockwise or counterclockwise direction) of the graphite sheet, namely, from the rear surface to the front surface or vice versa.

Since the energy band structure is independent of the clockwise or counterclockwise rolling or winding direction, the winding direction is not particularly discriminated in this description. However, the structure represented by the index $A(n_1,n_2)$ includes two kinds of structures related thereto in any case. Moreover, a new index $B(l_1,l_2)n$ will be introduced. In this connection, $n_1=l_1n$ and $n_2=l_2n$, where $l_1$ and $l_2$ are mutually prime and n is the greatest common measure of $n_1$ and $n_2$.

In the expression of the index $B(l_1, l_2)n$ $l_1, l_2$ represents the minimum constituent unit in the circumferential direction of the tube and n indicates the number of repetitions of the unit.

The definition of the substance having the band structure of FIG. 1 is associated with $n_1=2n_1$. This band structure is obtained through computations with a computer according to a tight-binding model. Hamiltonian H is assumed according to atomic orbitals $|i, \alpha>$ as follows.

$H=\Sigma|i,\alpha>E_i<i\alpha|+\Sigma|i,\alpha>t_{ij}<j\beta|$ where i is the number indicating the position of the atom, $\alpha$ stands for atomic orbitals including four orbitals 2s, 2px, 2py, and 2pz in this case, B denotes an atomic orbital energy, t is a hopping energy between adjacent atomic orbitals for a distance 4 Å at the maximum therebetween. These parameters are decided so as to appropriately reflect the band structure of graphite. As well-known in the art, the sum $\Sigma$ is taken of respective associated parameters, such as of atoms and orbitals.

Figure 3:
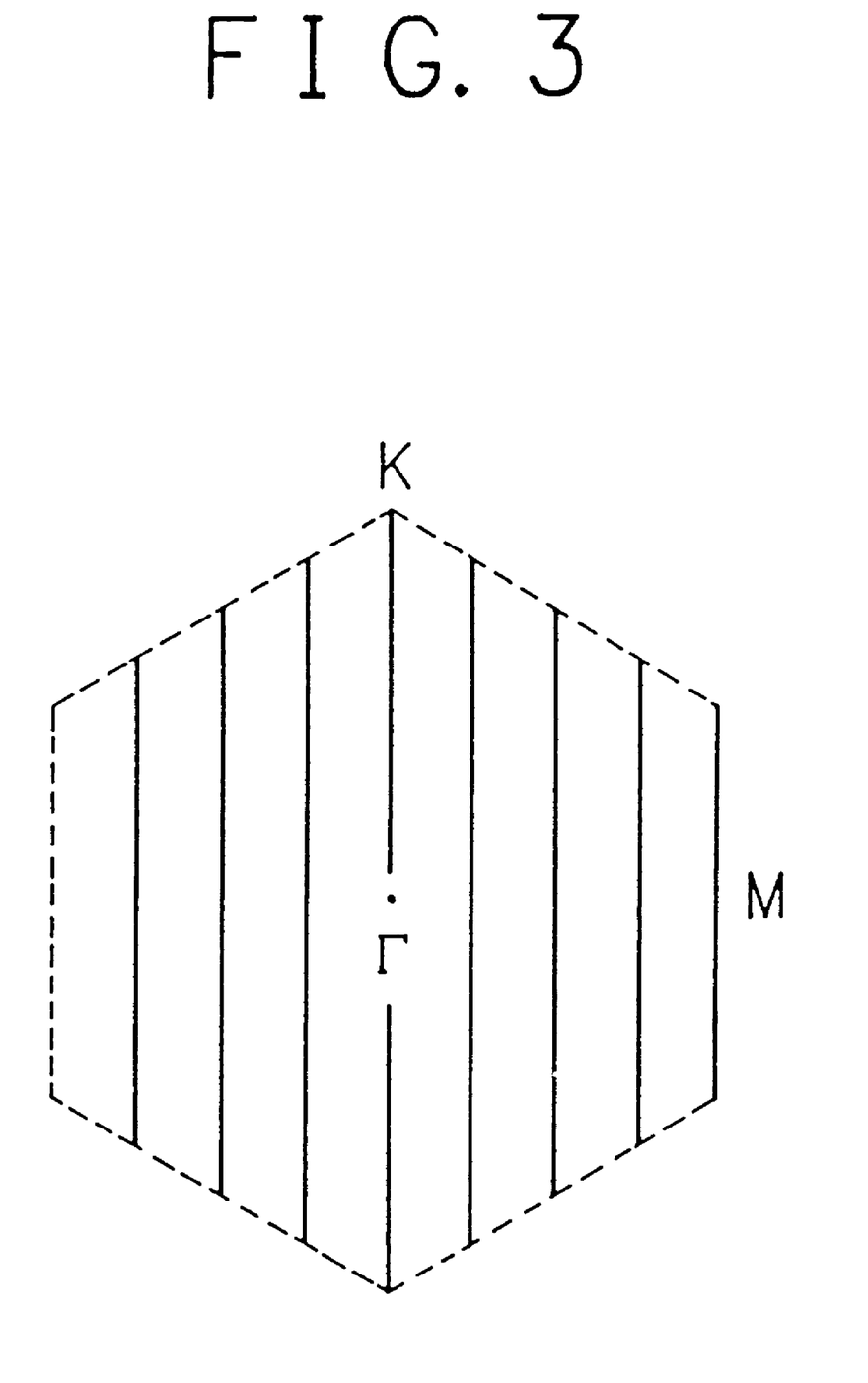
FIG. 3 is a diagram for explaining the band structure of the molectule according to Brillouin zone of graphite.

As a result of the band-structure calculation above, the band structure of FIG. 1 has been attained. In this embodiment, the band structure of metal is developed as shown in FIG. 1, the reason of which is explained as follows. FIG. 3 shows the first Brillouin zone of the graphite sheet. Considering a tube of B(2,1)4 in this situation, when a boundary condition is applied along the circumferential direction in a periodic manner, there is selected a wave vector k on eight lines in an inverse lattice vector space. Among the lines, there is a line which passes a point K. As seen in FIG. 1, two (bonding and antibonding) $p\pi$ bands are degenerate at the K point in the graphite sheet just at a corresponding point to the Fermi level. The B(2,1)4 tube has the band structure of metal because of this characteristic concerning the point K in the graphite sheet. The conclusion above applies to any tube of B(2,1)n with an arbitrary n.

Subsequently, description will be given of a method of manufacturing the tube of the embodiment. When a source of carbon is subjected to an arc discharge, there is grown such a tube on the side of a cathode of a carbon electrode. Supplying the carbon source with care, when the arc discharge is sustained for a long period of time in a sufficiently stable state, there is produced a long whisker crystal.

The obtained whisker crystal can be discriminated according to an image thereof taken by an electron microscope and a diffracted image attained by irradiating an electron beam onto the crystal. Even when the tube is formed of one layer, such a diffracted image can be attained. Moreover, the similar method is also applicable to the multi-layer concentric construction.

Figure 4A:
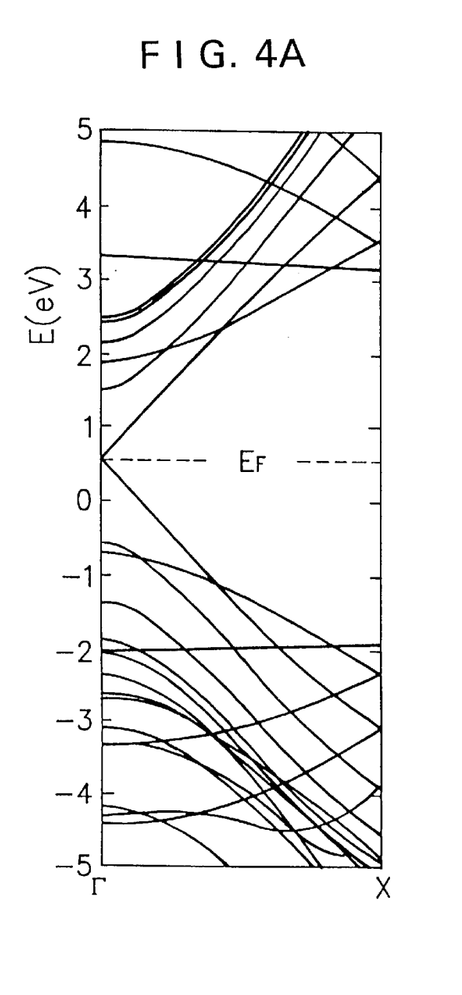
FIG. 4A and FIG. 4B are each diagrams schematically showing a second embodiment in accordance with the present invention in which 4A shows a one-dimensional band structure and 4B is a diagram for explaining the band structure of the molecule according to Brillouin zone of graphite.
Figure 4B:
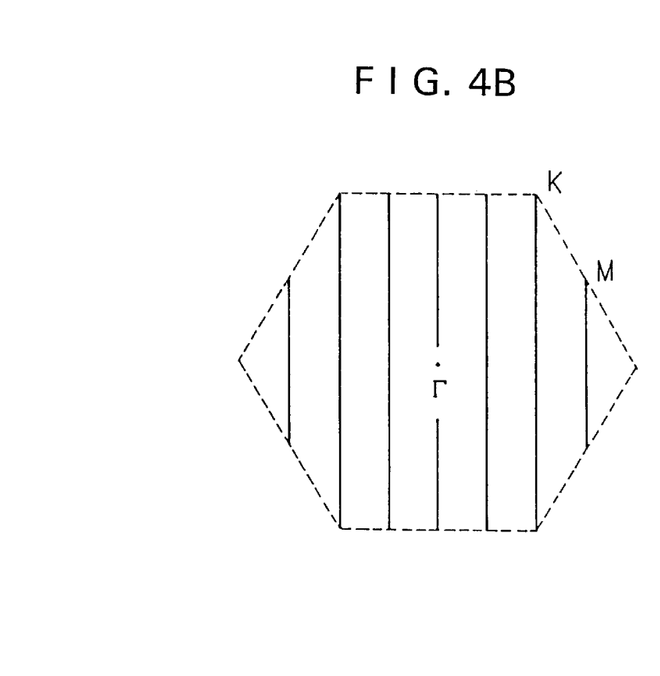

FIG. 4A and FIG. 4B each shows a crystal configuration in the second embodiment in accordance with the present invention. FIG. 4A shows a band structure of B(1,0)12. The antibonding $\pi$ band is higher than the Fermi level, whereas the bonding $\pi$ band is lower than the Fermi level. The bonding band $sp^2$ does not exceed −2.5 eV. At a point $\Gamma$, there appears a narrow band gap of 8 meV.

In FIG. 4B, seven allowable k vector lines of B(1,0)6 are shown in the first Brillouin zone of graphite. The line k for B(1,0)6 is drawn as follows. A line segment from a $\Gamma$ point on the k-space plane of graphite to the nearest point M is equally divided into three portions. Passing one of the points disposed for the division, the line k is drawn to be parallel to the direction shown in the diagram.

The narrow band gap in the band structure of B(1,0)12 occurs because the antibonding $\pi$ band and the bonding $\pi$ band are tightly fixed to each other (stick together) at the K point of the graphite sheet. The sticking of the two bands in the graphite sheet causes a narrow-gap band in the tube.

In the tube, when the graphite sheet is rolled and is hence distorted, the bond angle and the bond length are slightly distorted, which opens the narrow band gap. In general, for a band structure of B(1,0)3n, the line of k vector allowed in the first Brillouin zone of the graphite sheet passes the K point, thereby obtaining a semiconductor having a narrow band gap.

A one-dimensional semiconductor having such a narrow band gap is developed in a structure denoted as $n_1-2n_2=3l$ (l=1, 2, . . . ) for the following reason. Under this condition, the line of k vector allowed in the Brillouin zone of the graphite sheet also passes the K point.

Figure 5:
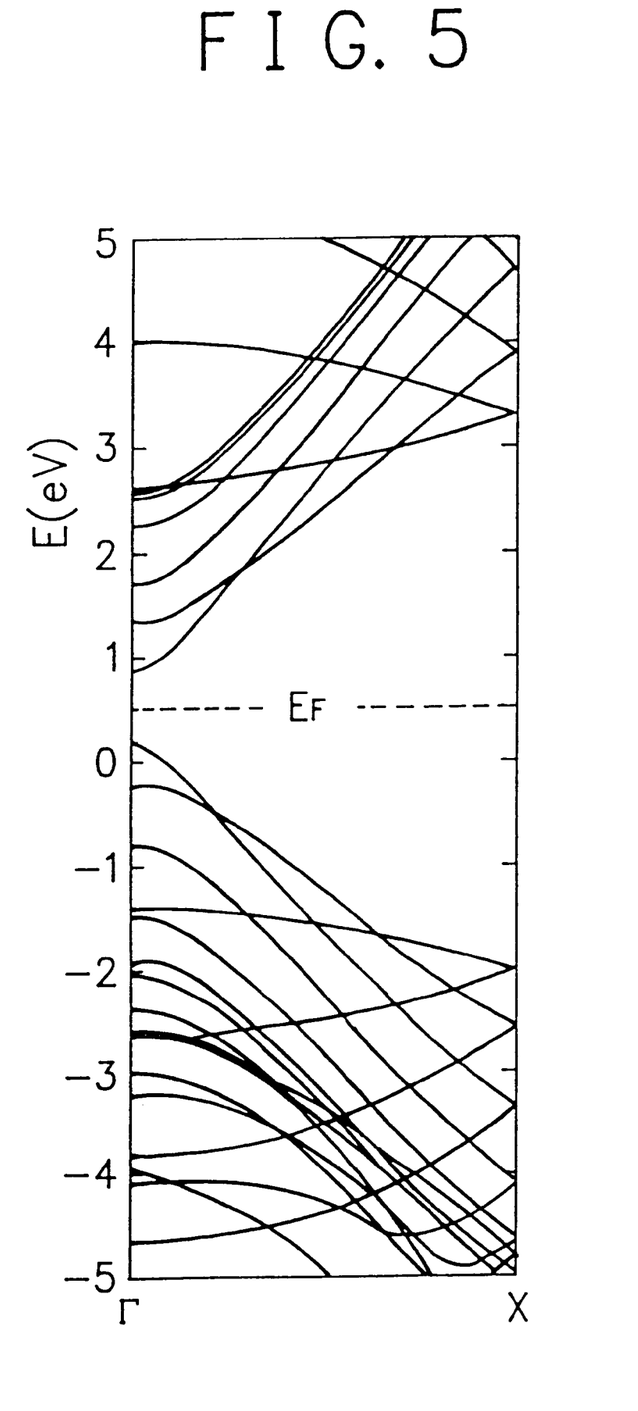
FIG. 5 is a diagram showing the band structure of a cylindrical macromolecule in a third embodiment in accordance with the present invention.

FIG. 5 shows a band structure of a graphite sheet in the third embodiment in accordance with the present invention. This diagram is a band structure of B(1,0)13. In this case, since the lines of k vector allowed in the Brillouin zone of the graphite sheet do not pass the K point, it is considered that there is produced a semiconductor having a moderate gap.

Figure 6:
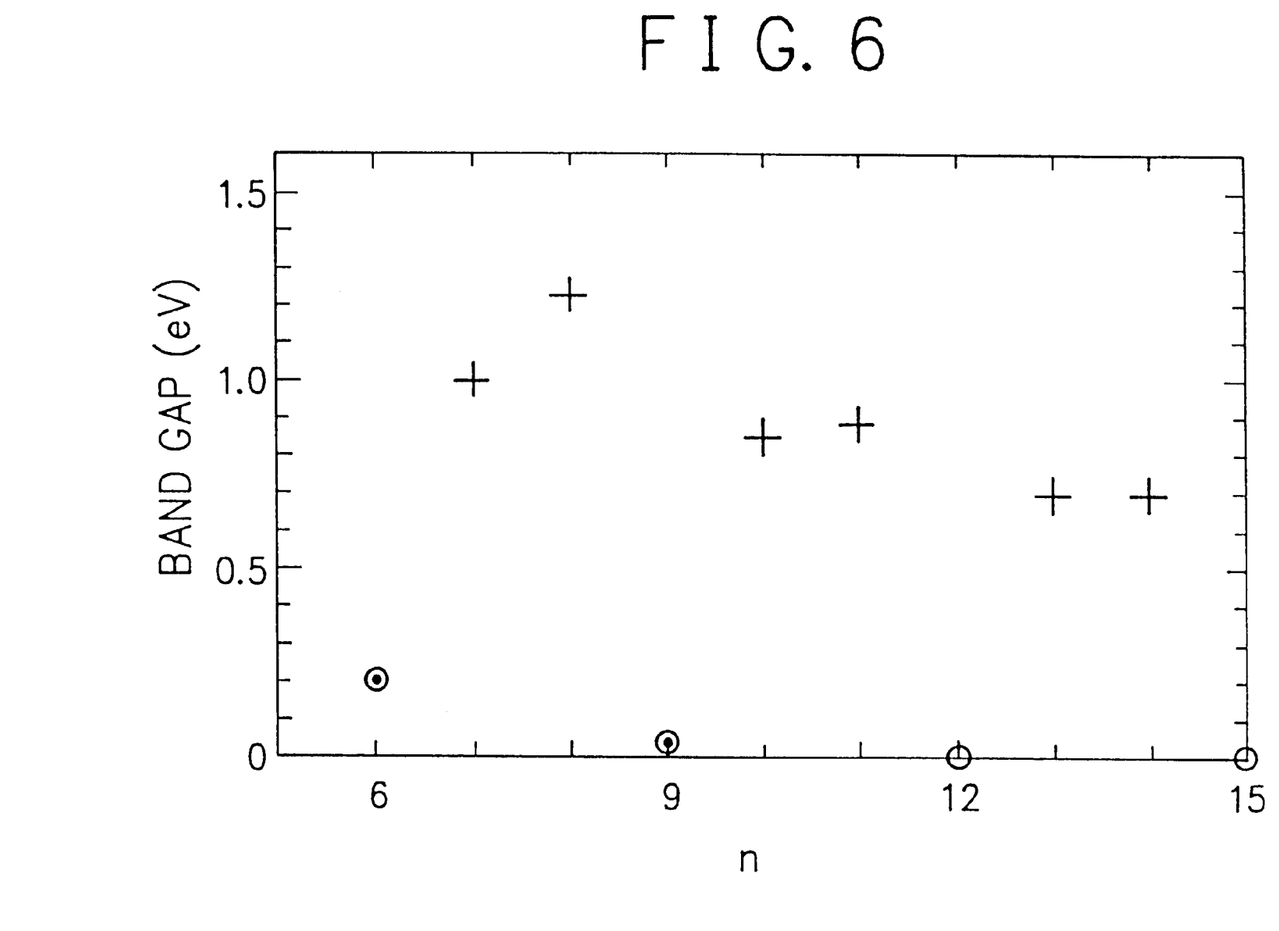
FIG. 6 is a schematic diagram showing dependence of B(1,0)n band gap on the value n.

FIG. 6 shows the band gap of B(1,0)n as a function of n. For the case of n of a multiple of three, description has already been given of the matter in conjunction with the semiconductor of the narrow band gap. For the other values of n, there is developed a semiconductor having a relatively wide band gap. However, as the value of n increases, the band gap becomes to be narrower. For quite a large value of n, the condition is similar to that of the graphite sheet and hence the gap becomes zero.

As can be appreciated from the discussion above, under the particular condition in which the line segment of k vectors allowed (according to the periodic boundary condition on the circumference in a tube) in the Brillouin zone of the graphite sheet passes the K point, there is produced a metal or a semiconductor with a narrow band gap. For any tube related to a pair $(n_1,n_2)$ not satisfying the conditions of the $n_1-2n_2=3l+1$ or $3l+2$ ($l=0, 1, 2, 3, \ldots$), there is developed a semiconductor of a relatively wide band gap.

Figure 7:
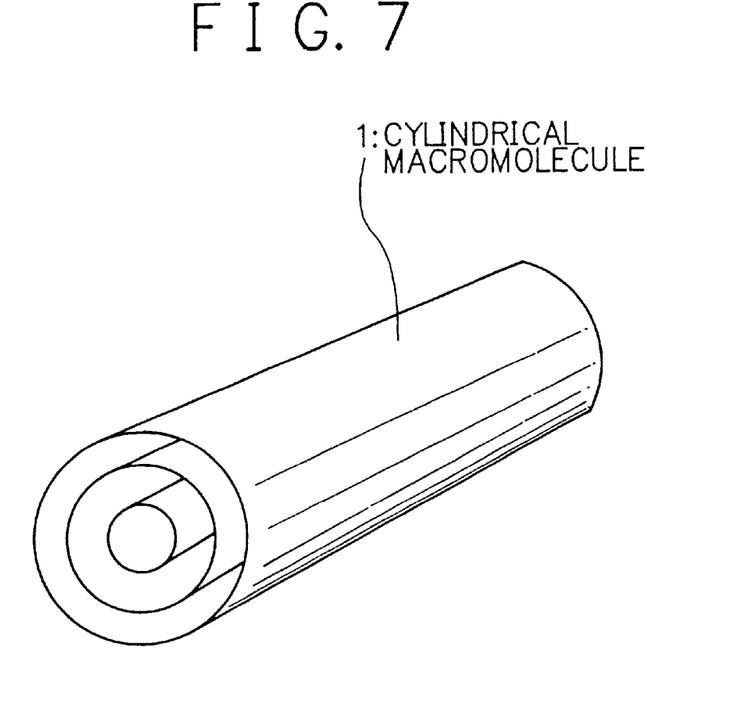
FIG. 7 is a diagram showing the structure of the multi-layer pipe of a cylindrical macromolecule in a fourth embodiment in accordance with the present invention.

FIG. 7 shows a concentric cylindrical structure having multiple metal layers in the fourth embodiment in accordance with the present invention. The diagram includes a concentric cylindrical macromolecule 1 of a combination of type-I pipes $B(2,1)n$, ($n=1, 2, \ldots$). Since each layer has a conductivity of metal, the overall cylindrical molecule develops a high conductivity.

In graphite, the respective layers are coupled with each other with a weak van der Waals force and hence a two-dimensional band structure can be observed. In the multi-layer cylinder, the number of hexagons varies in the radial direction and hence the adjacent layers are much more independent of each other. Consequently, also in the multi-layer construction, the features of the band structure of the sheet of the cylindrical form in the first to third embodiments are kept inherently unchanged.

Moreover, according to the results of observation of this construction by an electronic microscope, the distance between the concentric cylinders is about 0.34 nanometer, which is substantially equal to the interlayer spacing of graphite. Specifically, the distance h between planes of graphite is
6.7078/2≅3.35 Å. Due to the characteristic of the bond between carbon atoms, this value is not greatly changed in the tube. If such a large change takes place, another crystal structure will be formed.

In addition, the distance d between the centers of hexagons is 2.4612 Å. Consequently, the length of an edge thereof is $2.4612/\sqrt{3}=1.42$ Å. Accordingly, the difference in the number of hexagons between the layers is $2\pi h/d = 2\pi \times 3.35/2.46 = 8.56$, namely, eight to nine for tubes of $B(1,0)n$.

Figure 8:
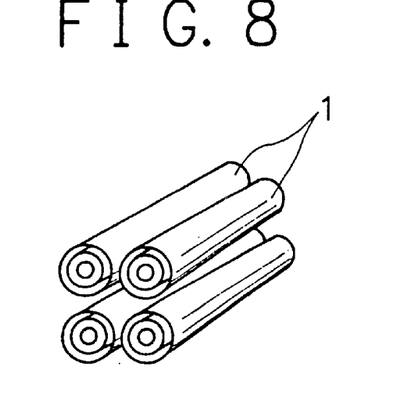
FIG. 8 is a diagram showing an example including a combination of the multi-layer pipes.

In an application, two or more concentric cylindrical macromolecules 1 can be combined as a complex as shown in FIG. 8.

Figure 9:
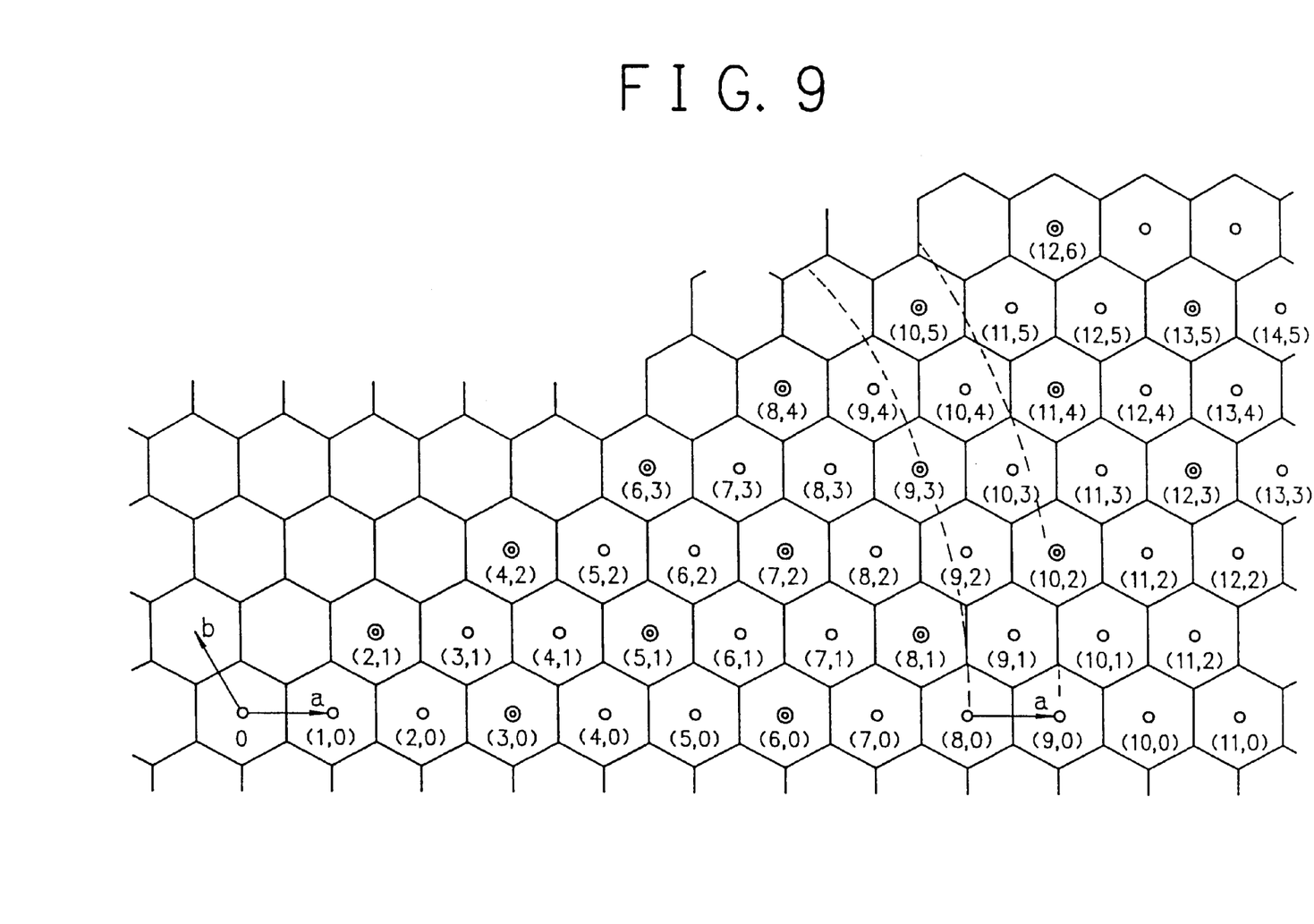
FIG. 9 is a diagram for explaining various methods of rolling the sheet of molecules into a tube.
Figure 10:
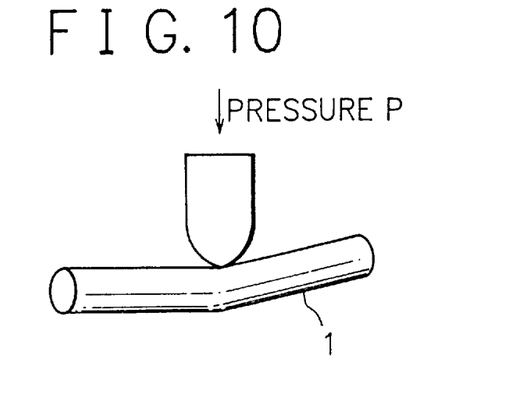
FIG. 10 is a diagram showing an application example of a pressure gauge.
Figure 11:
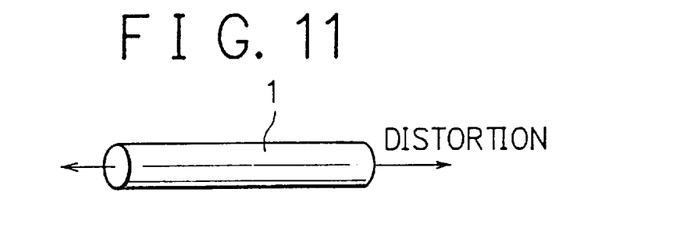
FIG. 11 is a diagram showing an application example of a distortion meter.
Figure 12:
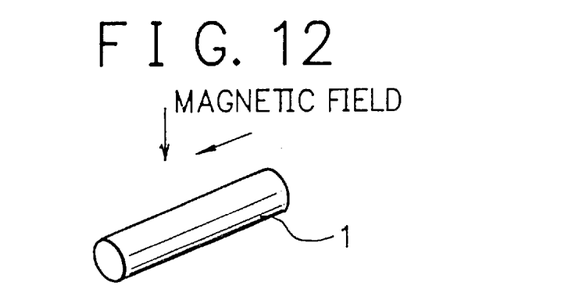
FIG. 12 is a diagram showing an application example of a magnetic flux measuring apparatus.
Figure 13:
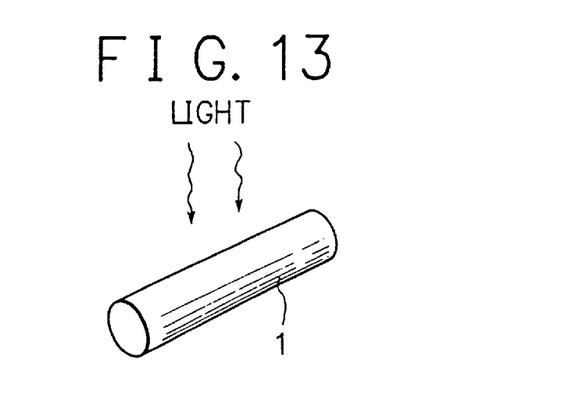
FIG. 13 is a diagram showing an application example of a photosensor.

FIG. 9 explains a situation of rolling sheets in a concentric fashion, in which the difference in the number of hexagons between the layers of the concentric cylinder is indicated with respect to various rolling directions, the difference being associated with the distance between the layers of graphite. In the diagram, two arcs are drawn through the points (8,0) and (9,0). Points located between these two arcs indicate the expected difference of the number of hexagons on the circumference between adjacent layers. The vector from the origin to the point represents the rolling direction of the layer.

In the tube of $B(2.1)n$, the state of $n=5$ is related to the region shown in FIG. 9 and hence the unit associated with $n=5$ corresponds substantially to the distance between the planes of graphite. That is, in the cases of $n=1+5m, 2+5m, 3+5m, 4+5m$, and $5+5m$ ($m=0, 1, 2, \ldots$), there is obtained a multi-layer concentric cylinder with a layer-to-layer distance substantially identical to the distance between the planes of graphite. (Each m corresponds to each layer in the concentric cylinder.) Next, a distance between the layers similar thereto is attained in a case where the change takes place with a unit of $n=4$ or $n=6$ instead of $n=5$. Moroever, depending on cases, these states may possibly be mixed with each other.

Next, according to the fifth embodiment, there is implemented a concentric cylinder with a narrow band gap. First, description will be given of a multi-layer concentric cylinder of $B(1,0)n$ of type II with $n=3m$ ($m=1, 2, \ldots$). In this situation, each layer is formed of a tube having a narrow band gap. According to the present stage of technology, although the value n ranges from about three to about 51, the value need not particularly limited. In the cases of $n=3+9l$, $6+9$ 1, $9+9$ 1 ($l=0, 1, 2, \ldots$), there is implemented a multi-layer concentric cylinder of a narrow band gap in which the difference in the number of hexagons in the circumferential direction is nine between the constituent cylinders.

In addition, in the cases represented by $(3,1)3m, (4,1)3m$ ($m=1, 2, \ldots$), $(5,1)n,n=2m+1, 2m+2$ ($m=0, 1, 2, \ldots$), $(8,1)m, (11,4)m, (7,2)m, (11,1)m$ ($m=1, 2, 3, \ldots$), there are developed multi-layer concentric cylinders each having a narrow band gap.

Subsequently, according to the sixth embodiment, there are attained concentric cylinders of semiconductor having a relatively wide band gap. Assume $n=1+3m$ or $n=2+3m$ ($m=0, 1, 2, \ldots$) for the pipes of $B(1,0)n$. Then, for each pipe, the semiconductor has a relatively large band gap. In consequence, the resultant concentric multi-layer cylinder of these pipes possesses a relatively wide band gap.

Particularly, in the cases of $n=1+9m, 2+9m, 4+9m, 5+9m, 7+9m$, and $8+9m$ ($m=0, 1, 2, \ldots$), there is obtained a multi-layer concentric cylinder of tubes having a relatively large band gap in which the difference in the number of hexagons is nine between the layers. Moreover, in the cases of $(3,1)n$ $n=1+3m$ or $2+3m$ and $(4,1)n,n=1+3m$ or $2+3m$ ($m=0, 1, 2, \ldots$), there is also attained a multi-layer concentric cylinder having a relatively large band gap.

In the seventh embodiment, there is formed a multi-layer concentric cylinder in which a first layer of a narrow band gap and a second layer of a relatively wide band gaps are alternately accumulated. For example, in a case where the difference in the value n is eight or ten between the layers in a multi-layer construction of layers represented as $B(1,0)n$, one of the three layers is related to a multiple of three and the other two layers has a relatively wide band gap.

For example, in a sequence of numbers $n=4, 12, 20, 28, 36, 44, 52, 60$, etc., if n is 12, 36, or 60, the layers of $B(1,0)n$ have a narrow band gap. In other cases, the layers have a wide band gap. Such cases are as follows. For $B(l_1, l_2)n$, the multi-layer structures represented as follows have the feature above: $(l_1, l_2)=(7,0), (7, 1), (7,3), (8,3), (9,1), (9,2), (9,4), (10,1), (10,3), (11,0), (11,2), (11,3), (11.5), (12,5)$, where $n=1, 2, 3$, etc.

Moreover, the feature above is obtained in following cases.

For $B(1,0)n$, $n=1+8m, 2+8m, 3+8m, 4+8m, 5+8m, 6+8m, 7+8m, 8+8m$ or $n=1+10m, 2+10m, 3+10m, 4+10m, 5+10m, 6+10m, 7+10m, 8+10m, 9+10m, 10+10m$; for $B(4,1)n$, $n=1+2m, 2+2m$; for $B(5,2)n$, $n=1+2m, 2+2m$; for $B(6,1)$, $n=1+2m, 2+2m$; and for $B(3,1)n$, $n=1+4m, 2+4m, 3+4m, 4+4m$, where $m=0, 1, 2$, etc.

In these embodiments, one layer of the narrow band gap and two layers of the wide band gap are alternately arranged in the concentric structure.

In the fourth to seventh embodiments, the structures of the layers of the embodiments of a multi-layer pipe have been represented with sequences of numbers related to the indices. However, as for the structure of layers, each sequence of numbers need not be naturally started with the initial term thereof. Namely, there may be included a structure represented with a sequence of numbers starting with an intermediate term and ending with an intermediate term.

In the eighth embodiment, there is configured a bundle of multi-layer concentric cylinders shown in the fourth to seventh embodiments. Each cylinder is grown as a long whisker crystal in the arc discharge carefully retained for a long period of time. The obtained cylinders are cut to have substantially the same length so as to be arranged into a bundle as shown in FIG. 8.

The bundle of pipes of the fourth embodiment develops a conductivity of metal.

The bundle formed of pipes of the fifth embodiment has a narrow band.

The bundle constructed with pipes of the sixth embodiment possesses a relatively wide band.

The bundle formed of pipes of the seventh embodiment includes a semiconductor having a narrow band gap and a semiconductor possessing a wide band.

It is to be appreciated that the bundles include also a bundle of a single-layer tube having only one layer.

The cylindrical macromolecule in accordance with the present invention can be used for various functional devices in addition to the thermometer.

FIGS. 10, 11, 12, and 13 shows application examples of the cylindrical macromolecule 1 in accordance with the present invention in which the macromolecule 1 is applied to a pressure gauge, a distortion meter, a magnetometer, and a photosensor, respectively. In the thermometer, there is used a macromolecule developing a characteristic of a semi-insulating material to measure a change in an electric resistance thereof. In the pressure meter, the distortion meter, and the magnetometer, a macromolecule having a narrow band gap is employed to sense a change in an electric resistance thereof. In the photometer, a macromolecule having a feature of an insulating material is adopted such that an intensity of infrared light is measured according to a photoconductive effect thereof.

In accordance with the present invention, using a cylindrical macromolecule and/or a concentric cylindrical macromolecule of carbon, there can be implemented a semiconductor having a narrow band gap and a semiconductor having a relatively wide band gap. In accordance with the present invention, the elastic constant of the cylindrical macromolecule in the direction vertical to the axis of the carbon tube is as small as those of copper and aluminum. Consequently, the material is quite flexible and a large change can be expected in the electric resistance thereof.

On the other hand, in the direction parallel to the axis of the carbon tube, the macromolecule has a very large elastic constant. In a case where the number of hexagons on the circumference is small or the number of nests is great, the tensile strength is equal to or more than that of diamond. Using these characteristics, there can be materialized various functional devices such as a thermometer, a pressure gauge, a distortion meter, a magnetometer, and a photosensor.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A property estimation method of a cylindrical nanotube, comprising the steps of:

confirming that the nanotube has a structure of $A(n_1, n_2)$ [<(add if necessary besides the description in the specification)], where $A(n_1, n_2)$ is a notation representative of a cylindrical structure geometrically obtainable from a planar graphite layer consisting of a repeated hexagon having a carbon atom at each vertex thereof and a covalent bond along each side thereof, by rolling up the graphite layer so that an identified hexagon by a position vector $n_1a+n_2b$ with respect to a reference hexagon in the graphite layer is superimposed on the reference hexagon in the cylindrical structure, where a is a unit displacement vector of the reference hexagon in a perpendicular direction to an arbitrary side of the reference hexagon, b is a unit displacement vector of the reference hexagon in a perpendicular direction to a second side from the arbitrary side of the reference hexagon, and $n_1$ and $n_2$ are integers[>];

confirming that the structure meets a condition of $n_1-2n_2=0$; and estimating that the nanotube has a metallic property.

2. A property estimation method of a cylindrical nanotube, comprising the steps of:

confirming that the nanotube has a structure of $A(n_1, n_2)$ [<(add if necessary besides the description in the specification)], where $A(n_1, n_2)$ is a notation representative of a cylindrical structure geometrically obtainable from a planar graphite layer consisting of a repeated hexagon having a carbon atom at each vertex thereof and a covalent bond along each side thereof, by rolling up the graphite layer so that an identified hexagon by a position vector $n_1a+n_2b$ with respect to a reference hexagon in the graphite layer is superimposed on the reference hexagon in the cylindrical structure, where a is a unit displacement vector of the reference hexagon in a perpendicular direction to an arbitrary side of the reference hexagon, b is a unit displacement vector of the reference hexagon in a perpendicular direction to a second side from the arbitrary side of the reference hexagon, and $n_1$ and $n_2$ are integers[>];

confirming that the structure meets a condition of $n_1-2n_2=3$ $l(l=1, 2, 3, \ldots )$; and estimating that the nanotube has a band structure with a narrow band gap.

3. A property estimation method of a cylindrical nanotube, comprising the steps of:

confirming that the nanotube has a structure of $A(n_1, n_2)$ [<(add if necessary besides the description in the specification)], where $A(n_1, n_2)$ is a notation representative of a cylindrical structure geometrically obtainable from a planar graphite layer consisting of a repeated hexagon having a carbon atom at each vertex thereof and a covalent bond along each side thereof, by rolling up the graphite layer so that an identified hexagon by a position vector $n_1a+n_2b$ with respect to a reference hexagon in the graphite layer is superimposed on the reference hexagon in the cylindrical structure, where a is a unit displacement vector of the reference hexagon in a perpendicular direction to an arbitrary side of the reference hexagon, b is a unit displacement vector of the reference hexagon in a perpendicular direction to a second side from the arbitrary side of the reference hexagon, and $n_1$ and $n_2$ are integers[>]; and confirming that the structure meets a condition of $n_1-2n2 \neq 3l$ $(l=0, 1, 2, \ldots )$; and estimating that the nanotube has a band structure with a moderate band gap.

4. A property estimation method of a cylindrical nanotube consisting of a plurality of coaxial nanotubes, comprising:

a first step of confirming that each coaxial nanotube has a metallic band structure when it is single-layered; and a second step of estimating that each coaxial nanotube has a metallic band structure in the cylindrical nanotube.

5. The property estimation method as claimed in claim 4, wherein the first step comprises the steps of:

confirming that the cylindrical nanotube has a structure of $B(l_1, l_2)n$, where n is a set of integers, [<(add if necessary besides the description in the specification] $l_1$ and $l_2$ are relatively prime integers and, letting p be an arbitrary element of the set n, $B(l_1, l_2)n$ is a notation representative of a nested structure of a corresponding number of coaxial cylindrical structures $A(l_1p, l_2p)$ to the number of elements of the set n, where letting $l_1p=n_1$ and $l_2p=n_2$, $A(n_1, n_2)$ is a notation representative of a cylindrical structure geometrically obtainable from a planar graphite layer consisting of a repeated hexagon having a carbon atom at each vertex thereof and a covalent bond along each side thereof, by rolling up the graphite layer so that an identified hexagon by a position vector $n_1a+n_2b$ with respect to a reference hexagon in the graphite layer is superimposed on the reference hexagon in the cylindrical structure, where a is a unit displacement vector of the reference hexagon in a perpendicular direction to an arbitrary side of the reference hexagon, b is a unit displacement vector of the reference hexagon in a perpendicular direction to a second side from the arbitrary side of the reference hexagon, and $n_1$ and $n_2$ are integers[>]; and confirming that [<letting p be an arbitrary element of the set n (this phrase is unnecessary, if the foregoing phrase is inserted)>] the structure meets a condition of $l_1p-2l_2p=0$ for each p.

6. The property estimation method as claimed in claim 5, further comprising the steps of:

confirming that the structure meets a combined condition of $l_1=2$ and $l_2=1$, the set n comprises a subset of a sequence of increasing integers with a variable difference between 4 and 6, both inclusive; and estimating that a pair of adjacent ones of the coaxial cylindrical structures have a radius difference therebetween substantially equivalent to an interlayer distance of a multi-layered graphite.

7. The property estimation method as claimed in claim 6, wherein:

the subset comprises q+rm, where r is 5, q is an integer between 1 and r, both inclusive, and m is a set of continuous integers.

8. A property estimation method of a cylindrical nanotube consisting of a plurality of coaxial nanotubes, comprising:

a first step of confirming that each coaxial nanotube has a band structure with a narrow band gap when it is single-layered; and a second step of estimating that each coaxial nanotube has a band structure with a narrow band gap in the cylindrical nanotube.

9. The property estimation method as claimed in claim 8, wherein the first step comprises the steps of:

confirming that the cylindrical nanotube has a structure of $B(l_1, l_2)n$, where n is a set of integers, [<(add if necessary besides the description in the specification] $l_1$ and $l_2$ are relatively prime integers and, letting p be an arbitrary element of the set n, $B(l_1, l_2)n$ is a notation representative of a nested structure of a corresponding number of coaxial cylindrical structures $A(l_1p, l_2p)$ to the number of elements of the set n, where letting $l_1p=n_1$ and $l_2p=n_2$, $A(n_1, n_2)$ is a notation representative of a cylindrical structure geometrically obtainable from a planar graphite layer consisting of a repeated hexagon having a carbon atom at each vertex thereof and a covalent bond along each side thereof, by rolling up the graphite layer so that an identified hexagon by a position vector $n_1a+n_2b$ with respect to a reference hexagon in the graphite layer is superimposed on the reference hexagon in the cylindrical structure, where a is a unit displacement vector of the reference hexagon in a perpendicular direction to an arbitrary side of the reference hexagon, b is a unit displacement vector of the reference hexagon in a perpendicular direction to a second side from the arbitrary side of the reference hexagon, and $n_1$ and $n_2$ are integers[>]; and confirming that [<letting p be an arbitrary element of the set n (this phrase is unnecessary, if the foregoing phrase is inserted)>] the structure meets a condition of $l_1p-2l_2p=3l$ (l=1, 2, 3, . . . ) for each p.

10. The property estimation method as claimed in claim 9, further comprising the steps of:

confirming that the structure meets a combined condition of $l_1=1$, $l_2=0$, and n=3m, where m is a sequence of increasing integers with a difference of 3; and estimating that a pair of adjacent ones of the coaxial cylindrical structures have a radius difference therebetween substantially equivalent to an interlayer distance of a multi-layered graphite.

11. A property estimation method of a cylindrical nanotube consisting of a plurality of coaxial nanotubes, comprising:

a first step of confirming that each coaxial nanotube has a band structure with a moderate band gap when it is single-layered; and a second step of estimating that each coaxial nanotube has a band structure with a moderate band gap in the cylindrical nanotube.

12. The property estimation method as claimed in claim 11, wherein the first step comprises the steps of:

confirming that the cylindrical nanotube has a structure of $B(l_1, l_2)n$, where n is a set of integers, [<(add if necessary besides the description in the specification] $l_1$ and $l_2$ are relatively prime integers and, letting p be an arbitrary element of the set n, $B(l_1, l_2)n$ is a notation representative of a nested structure of a corresponding number of coaxial cylindrical structures $A(l_1p, l_2p)$ to the number of elements of the set n, where letting $l_1p=n_1$ and $l_2p=n_2$, $A(n_1, n_2)$ is a notation representative of a cylindrical structure geometrically obtainable from a planar graphite layer consisting of a repeated hexagon having a carbon atom at each vertex thereof and a covalent bond along each side thereof, by rolling up the graphite layer so that an identified hexagon by a position vector $n_1a+n_2b$ with respect to a reference hexagon in the graphite layer is superimposed on the reference hexagon in the cylindrical structure, where a is a unit displacement vector of the reference hexagon in a perpendicular direction to an arbitrary side of the reference hexagon, b is a unit displacement vector of the reference hexagon in a perpendicular direction to a second side from the arbitrary side of the reference hexagon, and $n_1$ and $n_2$ are integers[>]; and confirming that [<letting p be an arbitrary element of the set n (this phrase is unnecessary, if the foregoing phrase is inserted)>] the structure meets a condition of $l_1p-2l_2p \neq 3l$ (l=0, 1, 2, . . . ) for each p.

13. The property estimation method as claimed in claim 12, further comprising the steps of:

confirming that the structure meets a combined condition of $l_1=1$, $l_2=0$, and the set n comprises a sequence of prime integers to 3;

confirming that a sequence of prime inters comprises a subset of a sequence of increasing integers with a difference of 9; and estimating that a pair of adjacent ones of the coaxial cylindrical structures have a radius difference therebetween substantially equivalent to an interlayer distance of a multi-layered graphite.

* * * * *